(12) United States Patent
Qiu et al.

(10) Patent No.: US 7,906,948 B2
(45) Date of Patent: Mar. 15, 2011

(54) THRESHOLD VOLTAGE MONITORING AND CONTROL IN SYNCHRONOUS POWER CONVERTERS

(75) Inventors: Weihong Qiu, San Jose, CA (US); Noel B. Dequina, Flemington, NJ (US)

(73) Assignee: Intersil Americas Inc., Milpitas, CA (US)

( * ) Notice: Subject to any disclaimer, the term of this patent is extended or adjusted under 35 U.S.C. 154(b) by 428 days.

(21) Appl. No.: 12/116,092

(22) Filed: May 6, 2008

(65) Prior Publication Data
US 2009/0027020 A1   Jan. 29, 2009

Related U.S. Application Data

(60) Provisional application No. 60/986,629, filed on Nov. 9, 2007.

(51) Int. Cl.
*G05F 1/613* (2006.01)
*G05F 1/656* (2006.01)

(52) U.S. Cl. ........ 323/282; 323/283; 323/284; 323/285; 323/222; 323/224

(58) Field of Classification Search ................. 323/282, 323/283, 284, 285, 286, 288, 222, 224
See application file for complete search history.

(56) References Cited

U.S. PATENT DOCUMENTS

| | | | |
|---|---|---|---|
| 4,298,835 A | 11/1981 | Rowe | |
| 4,541,041 A | 9/1985 | Park et al. | |
| 4,731,574 A | 3/1988 | Melbert | |
| 4,809,150 A | 2/1989 | Limuti et al. | |
| 4,814,684 A | 3/1989 | McCurdy | |
| 5,481,178 A | 1/1996 | Wilcox et al. | |
| 5,982,160 A * | 11/1999 | Walters et al. | 323/282 |
| 5,994,885 A | 11/1999 | Wilcox et al. | |
| 6,058,037 A * | 5/2000 | Shibata et al. | 363/132 |
| 6,246,220 B1 * | 6/2001 | Isham et al. | 323/224 |
| 6,396,250 B1 * | 5/2002 | Bridge | 323/283 |
| 6,643,145 B1 | 11/2003 | Harrison | |
| 6,812,677 B2 * | 11/2004 | Walters et al. | 323/277 |
| 6,815,936 B2 | 11/2004 | Wiktor et al. | |

(Continued)

OTHER PUBLICATIONS

Baliga et al., "Paradigm Shift in Planar Power MOSFET Technology", "Power Electronic Technology", Nov. 2003, pp. 24-32, Publisher: Penton Media Inc.

(Continued)

*Primary Examiner* — Bao Q Vu
(74) *Attorney, Agent, or Firm* — Fogg & Powers LLC (57) ABSTRACT

A method of providing threshold voltage monitoring and control in synchronous power converters is disclosed. The method establishes a threshold voltage level for at least one of an upper gate and a lower gate power switch in a synchronous power converter. The threshold voltage levels indicate switching delay times are present in the upper and lower gate power switches. The method detects body diode conduction levels for both the upper and lower gate power switches. When at least one of the detected body diode conduction levels exceed a prescribed body diode conduction level, the method adjusts the threshold voltage level for at least one of the upper and lower gate power switches to reduce a body diode conduction time for the at least one of the upper and lower gate power switches.

25 Claims, 5 Drawing Sheets

U.S. PATENT DOCUMENTS

| | | |
|---|---|---|
| 6,861,826 B2 * | 3/2005 | Lynch ............................ 323/224 |
| 6,933,706 B2 * | 8/2005 | Shih ............................... 323/222 |
| 6,940,262 B2 | 9/2005 | Dequina et al. |
| 7,098,640 B2 | 8/2006 | Brown |
| 7,161,332 B1 | 1/2007 | Kleine et al. |
| 7,508,175 B2 * | 3/2009 | DeWitt et al. .................. 323/224 |
| 2004/0012346 A1 | 1/2004 | Green et al. |
| 2004/0041619 A1 | 3/2004 | Nadd |
| 2005/0128776 A1 | 6/2005 | Dequina et al. |
| 2005/0184714 A1 | 8/2005 | Rusu et al. |
| 2006/0017421 A1 | 1/2006 | Solie et al. |
| 2007/0069236 A1 | 3/2007 | Capodivacca et al. |

OTHER PUBLICATIONS

"Synchronous Rectified MOSFET Driver (ISL6605)", "http://www.intersil.com/data/fn/fn9091.pdf", May 6, 2007, pp. 1-9, Publisher: Intersil Americas Inc.

Mappus, "Predictive Gate Drive Boosts Synchronous DC/DC Power Converter Efficiency", "Application Report—SLUA281", Apr. 2003, pp. 1-26, Publisher: Texas Instrument Inc.

"SI9150 Synchronous Buck Converter Controller", "Objective Specification", Sep. 10, 1991, Publisher: Siliconix Inc.

"Si9150 Power Products", "Datasheet", , Publisher: Siliconix Inc.

* cited by examiner

THRESHOLD VOLTAGE MONITORING AND CONTROL IN SYNCHRONOUS POWER CONVERTERS

This application claims the benefit of priority to U.S. Provisional Patent Application Ser. Nos. 60/951,259 (the '259 application) and 60/951,261 (the '261 application), each filed on Jul. 23, 2007, and to U.S. Provisional App. No. 60/986,629, filed on Nov. 9, 2007, the disclosures of which are each incorporated herein by reference in their entirety.

BACKGROUND

The most commonly used voltage regulator design is based on the sync-buck topology, and the output power switches are generally double-Diffused Metal Oxide Semiconductor Field-Effect Transistors, or DMOS FETs. The sync-buck circuit operation is known to require a short "dead time" to avoid the shoot through between upper and lower DMOS FETs to prevent short-circuiting the input power supply ($V_{IN}$) to ground if both DMOS FETs are turned on simultaneously. During this dead time, body diode conduction occurs. Body diode conduction leads to substantial power loss due to a relatively high-voltage drop across the P-N junction (when compared with the MOSFET voltage drop) and because of the reverse recovery loss associated with the stored charge.

Adaptive dead time control is known. For example, in adaptive dead time control, a gate threshold voltage of a first power MOSFET is monitored to make sure that it is off before a gate drive signal of a second power MOSFET is allowed to go high. However, the gate threshold voltage for different MOSFETs is different, and the gate threshold voltage levels for a given MOSFET change according to the operational temperature. For example, the gate threshold voltage can change from 1.6V at 0° C. to 1.16V at 100° C. To avoid the short-through issue under all operation conditions, the gate threshold voltage under the worst case has to also be considered, resulting in an even longer dead time for the body diode conduction under normal operational conditions. Accordingly, there is a need for improvements in threshold voltage monitoring and control in synchronous power converters.

SUMMARY

The following specification provides for threshold voltage monitoring and control in synchronous power converters and synchronous power converter driver circuits. This summary is made by way of example and not by way of limitation. It is merely provided to aid the reader in understanding some aspects of at least one embodiment described in the following specification.

Particularly, in one embodiment, a method of providing threshold voltage monitoring and control in synchronous power converters is provided. The method establishes a threshold voltage level for at least one of an upper gate and a lower gate power switch in a synchronous power converter, where each threshold voltage level is indicative of a switching delay time present in the upper and lower gate power switches (for example, turn-on and turn-off times of the upper and lower gate power switches). The method further detects body diode conduction levels for both the upper and lower gate power switches. When at least one of the detected body diode conduction levels exceed a prescribed body diode conduction level, the method adjusts the threshold voltage level for at least one of the upper and lower gate power switches to reduce a body diode conduction time for the at least one of the upper and lower gate power switches.

BRIEF DESCRIPTION OF THE DRAWINGS

These and other features, aspects, and advantages are better understood with regard to the following description, appended claims, and accompanying drawings where:

The various described features are drawn to emphasize features relevant to the embodiments disclosed. Like reference characters denote like elements throughout the figures and text of the specification.

DETAILED DESCRIPTION

Embodiments disclosed herein relate to threshold voltage monitoring and control in synchronous power converters and synchronous power converter driver circuits. At least one embodiment is described below with reference to one or more example applications for illustration. It is understood that numerous specific details, relationships, and methods are set forth to provide a fuller understanding of the embodiments disclosed. Similarly, the operation of well known components and processes has not been shown or described in detail below to avoid unnecessarily obscuring the details of the embodiments disclosed. For example, at least one embodiment relates to bi-directional threshold voltage calibration of synchronous power converters and switching regulators. In particular, a threshold voltage adjustment circuit is provided for driving upper and lower gate MOSFET output switches in the various implementations of synchronous power converters and switching regulators discussed herein. In one embodiment, the threshold voltage adjustment circuit discussed herein is considered an automatic calibration circuit that determines a near optimal voltage threshold level for the upper and lower gate MOSFET output switches in different power switching and conversion applications.

In one implementation of a synchronous buck converter, for example, the lower gate MOSFET will be turned off whenever the inductor current drops to zero. This is referred to as a diode emulation mode (DEM) for at least one of the body diodes of the upper and lower gate MOSFET output switches. When a drain voltage of the lower gate power MOSFET increases to zero volts, the inductive current of the synchronous buck converter equals zero. This condition is referred to herein as near zero inductor current crossing detection. Accordingly, a lower gate (LGATE) driver output for the lower power MOSFET is turned off when the drain voltage of the lower power MOSFET increases to zero. However, some parasitic parameters, as discussed below, will generally cause the drain voltage to be significantly higher than zero at the time the inductor current drops to zero. This condition can delay entry into the DEM mode and as a result, increase power dissipation of the converter.

In one embodiment, the threshold voltage monitoring disclosed herein improves system efficiency for voltage regulation systems at light load conditions. For example, the synchronous switching regulator operates in a discontinuous conduction mode (DCM) to substantially reduce any conduction power losses. Moreover, using the measurements of the body diode conduction during the discontinuous conduction mode, upper and lower threshold voltage references for the upper and lower power switches of the synchronous power converter driver circuit are increased (decreased) during operation to provide at least one form of dynamic bi-directional control of the threshold voltage. The dynamic bi-directional threshold voltage control contemplated here allows the synchronous power converter to automatically determine the upper and lower voltage threshold references and substantially reduce body diode conduction times for the body diodes of the power switches. For example, in one embodiment, both the upper and lower threshold voltage references increase with the body diode conduction levels and decrease in a near absence of the body diode conduction.

Figure 1A:
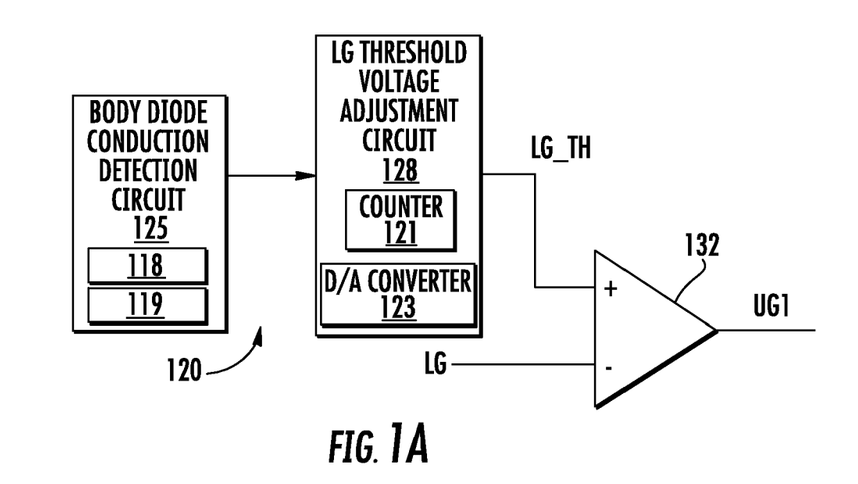
FIG. 1A is a block diagram of an embodiment of a lower gate driver output threshold voltage adjustment circuit.

FIG. 1A is a block diagram of an embodiment of a bi-directional threshold voltage adjustment circuit 120 including a LGATE, or LG, threshold voltage adjustment circuit 128. The circuit 120 comprises a body diode conduction detection circuit 125 coupled to the LG threshold voltage adjustment circuit 128. In at least one implementation, the body diode conduction detection circuit 125 comprises at least an amplifier 118 coupled across a body diode $D_2$ of a lower gate MOSFET power switch to an analog to digital (A/D) converter 119, as further discussed below with respect to FIG. 1D. The amplifier 118 provides an analog measurement of the body diode conduction level of the lower gate MOSFET power switch. The amplifier 118 provides the body diode conduction level measurement to the A/D converter 119 for conversion to a digital value to be interpreted by the LG threshold voltage adjustment circuit 128.

The output of the LG threshold voltage adjustment circuit 128, shown as LG_TH, is coupled to one input of a lower gate signal comparator 132, with the other input of the lower gate signal comparator 132 coupled to receive a signal, shown as LG, representative of a gate voltage at the gate of a lower MOSFET power switch. In one embodiment, the basic circuit for the LG threshold voltage adjustment circuit 128 includes at least a counter 121 and a digital to analog (D/A) converter 123. The counter 121 adjusts and stores the control data, while the D/A converter 123 converts the data in the counter 121 to the analog value of the threshold voltage.

Figure 1B:
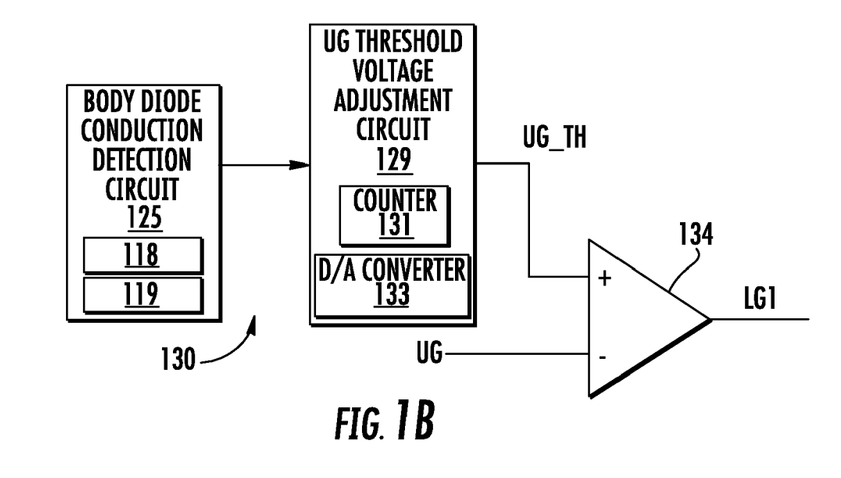
FIG. 1B is a block diagram of an embodiment of an upper gate driver output threshold voltage adjustment circuit.

FIG. 1B is a block diagram of an embodiment of a bi-directional threshold voltage adjustment circuit 130 including an upper gate (UGATE, or UG) threshold voltage adjustment circuit 129. Similar to the example embodiment of FIG. 1A, the circuit 130 shown in FIG. 1B comprises the body diode conduction detection circuit 125 coupled to the UG threshold voltage adjustment circuit 129. For example, in one implementation, the circuit 130 utilizes the same body diode conduction detection circuit 125 as the circuit 120 of FIG. 1A coupled across the body diode $D_2$ of the lower gate MOSFET power switch, as discussed below with respect to FIG. 1D.

The output of the UG threshold voltage adjustment circuit 129, shown as UG_TH, is coupled to one input of an upper gate signal comparator 134, with the other input to the upper gate signal comparator 134 coupled to receive a signal, shown as UG, representative of a gate voltage at the upper gate MOSFET power switch. Similar to the circuit 120 of FIG. 1A, the basic circuit for the UG threshold voltage adjustment circuit 129 includes at least a counter 131 and a D/A converter 133.

Figure 1C:
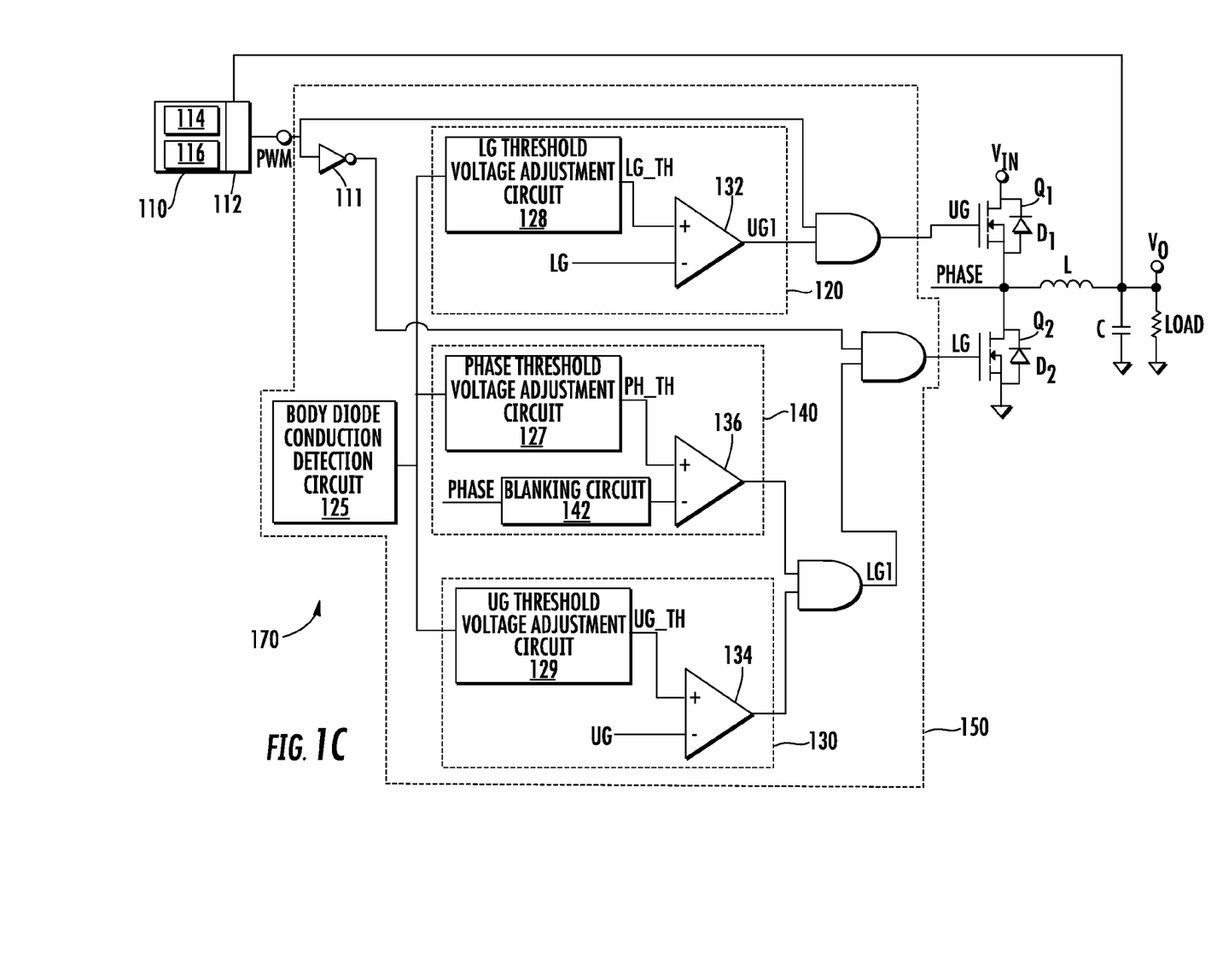
FIG. 1C is a block diagram of an embodiment of a synchronous converter having at least one threshold voltage adjustment circuit and a diode emulation mode control circuit.

FIG. 1C is a block diagram of an embodiment of a simplified voltage regulation system 170 and a driver control circuit 150 for upper and lower output MOSFET switches of a synchronous power converter. For example, in one embodiment, switches Q1 and Q2 as shown in FIG. 1C represent n-DMOS output power switches. In the example embodiment of FIG. 1C, the driver 150 includes a UG turn-on timing adjustment circuit 120, an LG turn-on timing adjustment circuit 130, and a diode emulation mode (DEM) control circuit 140. The DEM control circuit 140 comprises the body diode conduction detection circuit 125 of FIGS. 1A and 1B further coupled to a PHASE threshold voltage adjustment circuit 127. The DEM control circuit 140 further comprises a phase node signal comparator 136. The phase node signal comparator 136 receives a first output (PH_TH) from the PHASE threshold voltage adjustment circuit 127 and a second output from a blanking circuit 142. The blanking circuit 142 receives an input from a PHASE node as shown in FIG. 1C. Moreover, the output of the phase node signal comparator 136 is shown as being logically combined with the output of the LG turn-on timing adjustment circuit 130 to provide an output signal LG1 as also shown in FIG. 1C.

A controller 110 for the system 170, not shown in any particular detail, is well known in the art, and typically comprises an error amplifier 112 with feedback components, a modulator circuit 114, and one or more level shifters 116 to translate the resulting desired pulse widths into signal levels suitable for the upper gate and lower gate drivers of the switches Q1 and Q2, respectively. For example, a reference voltage is typically applied to a non-inverting input of the error amplifier 112 with a feedback signal from $V_{OUT}$ coupled to the inverting input of the error amplifier 112. The output of the error amplifier 112 drives a pulse width modulator (PWM), with the output shown as PWM in FIG. 1C. In one implementation, the controller 110 comprises a multi-phase buck PWM controller 110. In addition, although the system 170 is shown as a single phase converter, the threshold voltage adjustment circuits 120 and 130 can be used with multi-phase voltage regulation systems, whether coupled or uncoupled, such as by employing an additional adjustment circuit per phase.

In operation, the driver 150 receives the PWM output from the controller 110 and its inverted representation via an inverter 111. The driver 150 drives the gates of the switches Q1 and Q2. These signals are shown in FIG. 1C as UG and LG. In at least one implementation, the driver 150 further comprises a non-overlap circuit (for example, an adaptive shoot-through protection circuit; not shown) that prevents the switches Q1 and Q2 from both conducting at the same time. The desired output of the system 170 is at the PHASE node, which is at a source of the switch Q1 and a drain of the switch Q2. The DEM control circuit 140 detects a PHASE node voltage level. For example, the voltage at the PHASE node switches between levels approaching $V_{IN}$ (when the upper switch Q1 is on) and ground (when the lower switch Q2 is on). In one embodiment, the voltage output from the PHASE node passes through a low pass filter circuit portion of the system 170 comprising an inductor L in series with a capacitor C to become $V_{OUT}$ across a LOAD.

In one implementation, for positive inductor current in the lower switch Q2, a body diode D2 of the lower switch Q2 will be turned on during the dead time, while a body diode D1 for the upper switch Q1 will be on for the negative inductor current. To detect the conduction of the body diode D1 of the upper switch Q1, the DEM control circuit 140 compares the PHASE node voltage to a first threshold voltage reference. In one embodiment, when the PHASE node voltage exceeds the first threshold voltage reference (for example, 0V, or ground), the lower body diode D2 will be ON. Similarly, when the lower switch Q2 is turned off with negative inductor current, the PHASE node voltage is compared to a second threshold voltage reference (for example, 0.8V) to indicate upper body diode conduction.

Regarding operation of the DEM control circuit 140, the blanking circuit 142 provides an output at a logic low level to ensure the LG1 output is high to turn on the lower gate (of the switch Q2) at the beginning of the lower gate turn-on interval. For example, the switch Q2 is turned off whenever current in the inductor L drops to zero. When turning off the lower gate voltage prior to entering the DEM mode, a drain voltage of the switch Q2 increases as the inductor current decreases, and both the current flowing through the switch Q2 and the drain voltage of the switch Q2 are monitored by the DEM control circuit 140. When the drain voltage of the switch Q2 increases to zero volts, the inductor current equals zero. As discussed above, this condition is referred to herein as near zero inductor current crossing detection. Accordingly, a lower gate (LGATE) driver output of the switch Q2 is turned off when the drain voltage of the switch Q2 increases to zero.

Regarding operation of the LG turn-on timing adjustment circuit 130, the gate voltage UG at the gate of the switch Q1 is compared to an upper gate threshold voltage to make sure the upper switch Q1 is off before the lower switch Q2 is allowed to be turned on. In one embodiment, when a body diode conduction level is detected at the gate of the lower switch Q2, the upper gate threshold voltage is increased by at least one voltage step in the LG threshold voltage adjustment circuit 128 to turn on the lower switch Q2 earlier to substantially reduce dead time. If the lower body diode D2 does not conduct, the upper gate threshold voltage is reduced one step to turn on the lower switch Q2 at a later time for an increase in dead time.

Regarding operation of the UG turn-on timing adjustment circuit 120, the gate voltage LG is compared to a lower gate threshold voltage to make sure the lower switch Q2 is off before the upper switch Q1 is allowed to be turned on. In one embodiment, when the lower body diode conduction level is detected to be on, the lower gate threshold voltage is increased by the UG threshold voltage adjustment circuit 129 to turn on the upper switch Q1 earlier to reduce dead time. If the PHASE node voltage exceeds the second threshold voltage reference (for example, 0.8V) before the upper switch Q1 is allowed to turn on (meaning that the upper body diode D1 is on), the lower gate threshold voltage is increased. If no lower body diode conduction is detected, the lower gate threshold voltage is reduced to turn on the upper switch Q1 at a later time to increase the dead time.

Figure 1D:
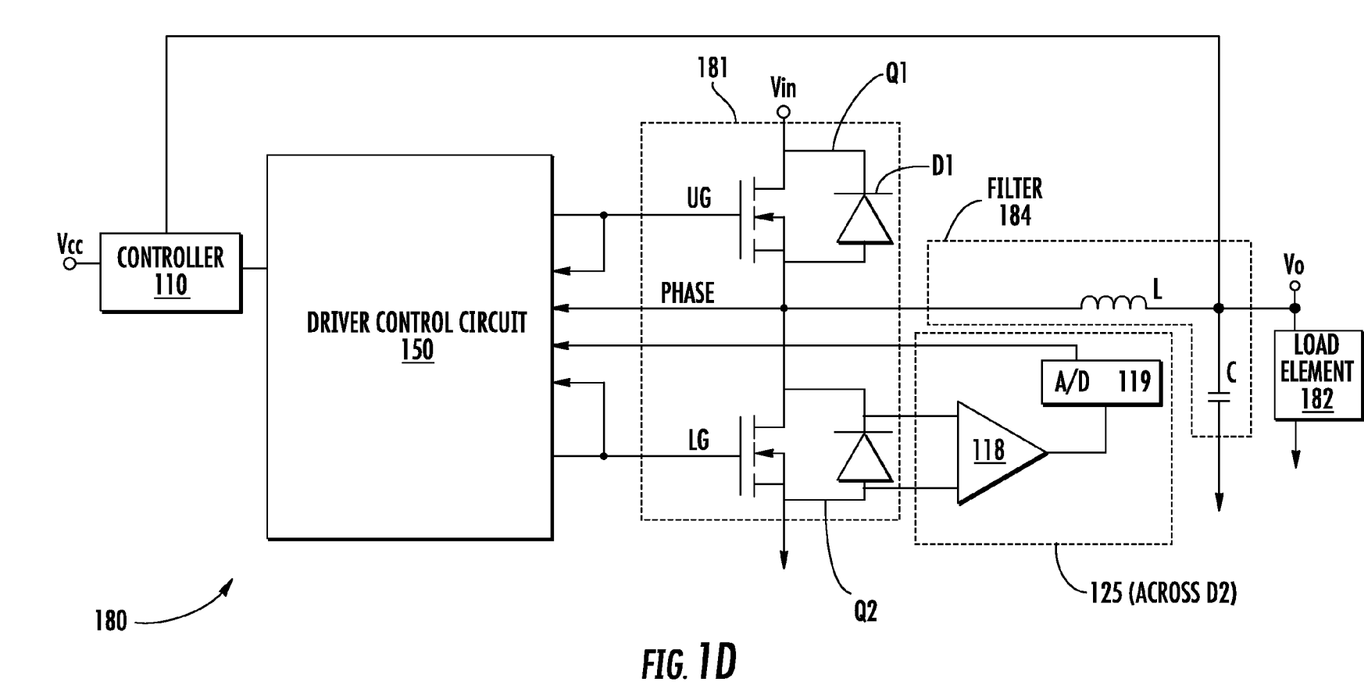
FIG. 1D is a block diagram of an exemplary embodiment of an electronic device having a switching regulator with at least one threshold voltage adjustment circuit and a diode emulation mode control circuit.

FIG. 1D is a block diagram of an exemplary embodiment of an electronic device, indicated generally at 180, having a switching regulator 181 with at least one threshold voltage adjustment circuit and a diode emulation mode control circuit. The electronic device 180 comprises a load element 182 coupled to the switching regulator 181. The electronic device 180 further comprises the body diode conduction detection circuit 125 of FIGS. 1A and 1B and the driver control circuit 150 of FIG. 1C. In one implementation, the load element 182 is a variable load element comprising one of a microprocessor, a microcontroller, a field-programmable gate array (FPGA), a field-programmable object array (FPOA), a programmable logic device (PLD), or an application-specific integrated circuit (ASIC). The electronic device 180 further includes a filter element 184 coupled between the load element 182 and the switching regulator 181. In the embodiment of FIG. 1D, the filter element 184 is similar to the low pass filter discussed above with respect to FIG. 1C.

As described in further detail below with respect to FIGS. 2 and 3, by monitoring the body diode conduction using the body diode conduction detection circuit 125, the dead time between the gate driving signal for a lower switch Q2 and an upper switch Q1 of the switching regulator 181 is dynamically adjusted for the device 180. For example, the driver control circuit 150 can be used to set the dead time for different, external operational conditions with different power MOSFETs (similar to the switches Q1 and Q2) to a substantially smaller time interval than prior voltage regulation systems. In a similar implementation, and as described in further detail below with respect to FIGS. 4 and 5, the threshold voltage of the zero current crossing detection in a diode emulation operation is adjusted bi-directionally based on the body diode conduction of at least the body diode $D_2$ of the switching regulator 181. In the exemplary embodiment of FIG. 1D, both adjustments improve the system efficiency, and can be used separately or in unison.

Figure 2:
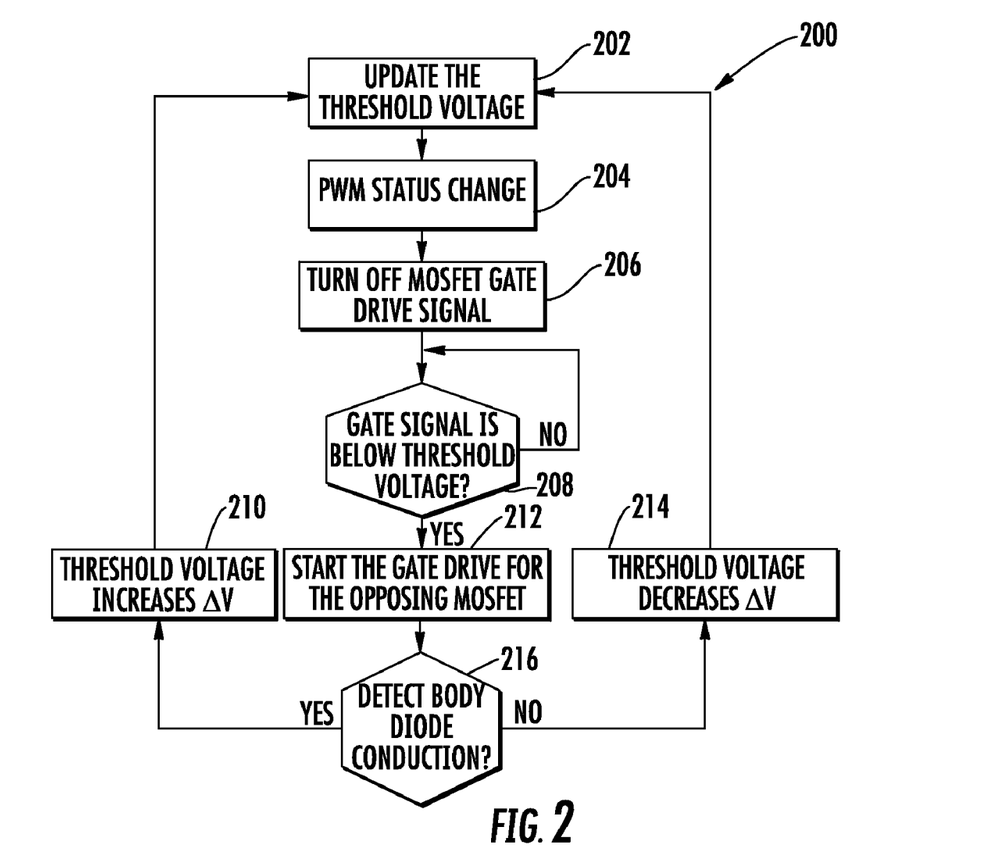
FIG. 2 is a flow chart of an embodiment of a method of providing threshold voltage monitoring and control for a synchronous power converter.

FIG. 2 is a flow chart of an embodiment of a method 200 for dynamic threshold voltage control providing at least one form of dead time control as discussed herein. In typical operation, and in reference to the threshold adjustment circuits of FIG. 1C, a voltage detection threshold in the gate signal comparators 132, 134 and 136 is adjusted based on the near presence or absence of body diode conduction. In one embodiment, when a status change in PWM is detected (block 204), a MOSFET gate drive signal (for example, the gate drive signal LG) is turned off (block 206). Once a gate signal from one of the gate signal comparators 132, 134 and 136 is below a threshold voltage reference (block 208), the method 200 initializes a gate driver for the opposing MOSFET gate drive signal (for example, the gate drive signal UG) at block 212. When body diode conduction is detected (block 216), the method 200 increases the threshold voltage reference to reduce dead time (block 210). Generally, if body diode conduction is detected, it indicates that the dead time is too long. In response, the threshold voltage reference increases to reduce the dead time. In one implementation, the adjusted step level can be a fixed voltage or proportional to the ON duration of the body diode (for example, if the body diode is on for a relatively long time with respect to a desired amount of dead time, the threshold voltage reference is increased by more than one step). If no body diode conduction is detected, it indicates that the dead time may be too short, and the threshold voltage reference is reduced in response to increase the dead time (block 214).

Figure 3:
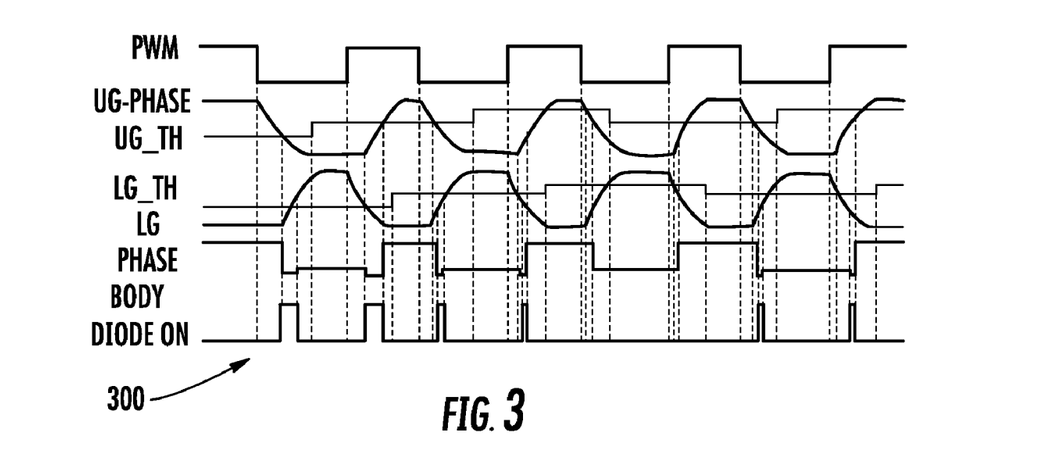
FIG. 3 is an illustration of operational signal waveforms of an embodiment of a synchronous power converter during the threshold voltage monitoring and control provided by the method of FIG. 2.

FIG. 3 illustrates at least one embodiment of operational signal waveforms 300 for dynamic threshold voltage control. In the example embodiment of FIG. 3, the waveforms 300 represent at least one operating cycle of the driver control circuit 150 of FIG. 1C. As shown, the threshold voltage dynamically adjusts around a driver voltage level (for example, the PHASE node voltage) which provides a near zero body diode conduction level as evidenced by the short time for the body diode ON after several body diode ON cycles. Since the threshold voltage is dynamically adjusted, it will automatically find a near optimal operational voltage for different power switches under different operational conditions (for example, changes in operating temperature).

In one embodiment, the driver 150 adjusts the threshold voltage in incremental step voltages to avoid a large change to dead time for each adjustment. For example, a digital voltage adjustment circuit (not shown) can be used to adjust the voltage step by step. Since the threshold voltage is adjusted dynamically and continuously, it will move to a new position when the operational condition is changed. Therefore, the threshold voltage can be dynamically adjusted to achieve a short dead time under different operational conditions as illustrated by the repetitive cycles of FIG. 3. As shown in FIG. 3, the body diode conduction time decreases as the threshold values UG_TH and LG_TH are adjusted.

Figure 4:
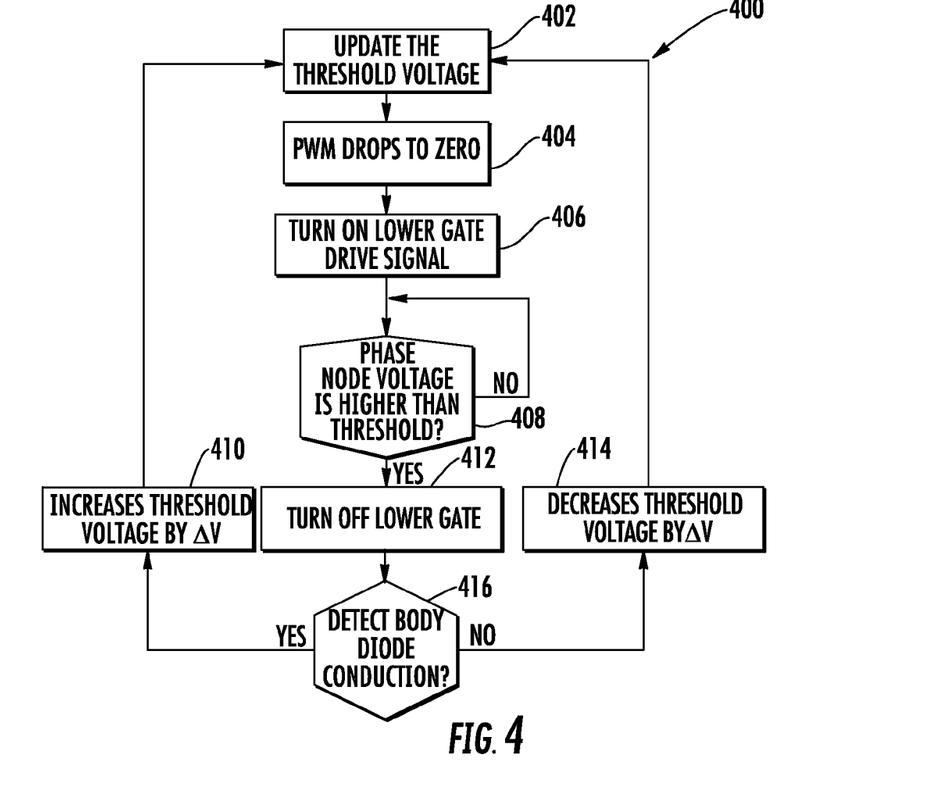
FIG. 4 is a flow chart of an embodiment of a method of providing threshold voltage monitoring and control for a synchronous power converter.
Figure 5:
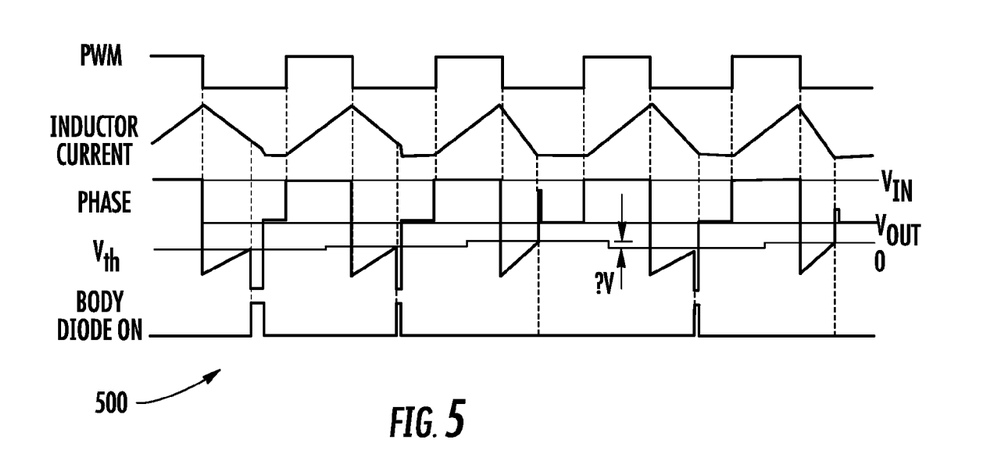
FIG. 5 is an illustration of operational signal waveforms of an embodiment of a synchronous power converter during the threshold voltage monitoring and control provided by the method of FIG. 4.

As described above, the bi-directional threshold voltage correction method shown in FIG. 2 can also be used for zero current crossing detection in diode emulation mode (DEM) control. For example, FIG. 4 is a flow chart diagram of an embodiment of a method of providing at least one form of bi-directional threshold voltage control for a synchronous converter. FIG. 5 is an illustration of operational signal waveforms 500 of an embodiment of a synchronous converter during the dynamic threshold voltage monitoring and control provided by the method of FIG. 4. In the example embodiment of FIG. 5, the waveforms 500 represent at least one operating cycle of the driver control circuit 150 of FIG. 1C.

In the method illustrated in FIG. 4, to accurately detect the timing of zero inductor current, the threshold voltage reference adjusts to correct the error due to the parasitic parameters, such as inductance of the power MOSFET pin. In one embodiment, when PWM drops to near zero (block 404), a LGATE drive signal (for example, the gate drive signal LG) is turned on (block 406). In one embodiment, the DEM control circuit monitors and compares the PHASE node voltage to at least one threshold voltage reference to detect the voltage drop of the lower MOSFET when the lower MOSFET is on (block 408). For positive inductor current, the PHASE node voltage should be less than a predetermined level, such as <0 V.

When the PHASE node voltage is equal to zero (that is, the inductor current is near zero), the lower gate of the lower output switch should be turned off (block 412). If the lower gate is turned off too early, the lower body diode will be on with large negative voltage (for example, <−0.3V) at the PHASE node; if the lower gate is turned off too late, some negative inductor current builds up, so the upper body diode will be turned on with a sufficiently high voltage at the PHASE node. In response, the threshold voltage reference is adjusted based on a detected level of body diode conduction (block 416): if the lower body diode is on after the lower gate is off (for example, turned off too early), the threshold voltage reference is increased (block 410); if the PHASE node voltage jumps substantially higher after the lower gate is off (for example, the lower gate is turned off too late), the threshold voltage reference is reduced (block 414). This threshold voltage reference for zero current crossing detection is adjusted dynamically and continuously to achieve a near minimal conduction time for the upper and lower body diodes of the upper and lower power switches for improved system efficiency as illustrated by the repetitive cycles of FIG. 5. As shown in FIG. 5, the body diode conduction time (Body diode ON) decreases as the threshold voltage ($V_{Th}$) is dynamically adjusted. In one implementation, the threshold voltage can be adjusted by a fixed step voltage or a voltage level proportional to the ON duration of the body diode (for example, if the body diode is on for a relatively long time with respect to a desired conduction time, the threshold voltage reference is adjusted in larger steps).

This description has been presented for purposes of illustration, and is not intended to be exhaustive or limited to the embodiments disclosed. Variations and modifications may occur, which fall within the scope of the following claims. For example, some of the components described above may be implemented using either digital or analog circuitry, or a combination of both, and also, where appropriate, realized through software executing on suitable processing circuitry. Embodiments discussed herein can be used in a variety of circuits, such as for power MOSFET drivers and integrated driver/output switches, as well as related voltage regulation systems, including computing and switching mode power supply systems.

What is claimed is:

1. A method of providing threshold voltage monitoring and control in synchronous power converters, the method comprising:
    establishing a threshold voltage level for at least one of an upper gate and a lower gate power switch in a synchronous power converter, each threshold voltage level indicative of a switching delay time present in the upper and lower gate power switches;
    detecting body diode conduction levels for both the upper and lower gate power switches; and
    when at least one of the detected body diode conduction levels exceeds a prescribed body diode conduction level, adjusting the threshold voltage level for at least one of the upper and lower gate power switches to reduce a body diode conduction time for the at least one of the upper and lower gate power switches.

2. The method of claim 1, wherein establishing the threshold voltage level for at least one of the lower and upper gate power switches further comprises initializing at least a gate driver signal for the upper gate in response to a gate driver signal at the lower gate.

3. The method of claim 2, wherein initializing the gate driver signal level for the upper gate comprises disabling the gate driver signal level for the lower gate based on an observable change from a controller of the synchronous power converter.

4. The method of claim 1, wherein adjusting the threshold voltage level for at least one of the lower and upper gate power switches comprises reducing a dead-time interval for the upper and lower gate power switches in response to the switching delay time present in the upper and lower gate power switches.

5. The method of claim 1, wherein adjusting the threshold voltage level for at least one of the upper and lower gate power switches comprises determining a phase node voltage level between the upper and lower gate power switches that provides a near zero body diode conduction level in response to external operating conditions.

6. The method of claim 1, wherein adjusting the threshold voltage level for at least one of the lower and upper gate power switches comprises providing near zero inductor current crossing detection for a diode emulation mode (DEM) control portion of the synchronous power converter based on the detected body diode conduction level.

7. A driver control circuit for a synchronous power converter, comprising:
    at least one body diode conduction detection circuit operable to detect body diode conduction of one or more body diodes associated with at least one of an upper and a lower power switch of the synchronous power converter;

a diode emulation mode circuit in operative communication with the at least one body diode conduction detection circuit, the diode emulation mode circuit operable to detect a phase node voltage of the synchronous power converter;

a lower gate turn-on timing adjustment circuit operable to adjust a first threshold voltage reference for a lower gate of the upper power switch, the lower gate turn-on timing adjustment circuit in operative communication with the at least one body diode conduction detection circuit;

an upper gate turn-on timing adjustment circuit operable to adjust a second threshold voltage reference for an upper gate of the lower power switch, the upper gate turn-on timing adjustment circuit in operative communication with the at least one body diode conduction detection circuit; and wherein the upper and lower gate turn-on timing adjustment circuits are operable to set and adjust a dead time interval between a gate driver signal for each of the upper and lower power switches for different operational conditions by monitoring body diode conduction levels present in the driver control circuit via the at least one body diode conduction detection circuit.

8. The circuit of claim 7, wherein the at least one body diode conduction detection circuit comprises:

an amplifier coupled across at least the body diode of the lower power switch; and an analog to digital converter responsive to the amplifier, the analog to digital converter operable to provide a digital representation of the amplified body diode conduction level for each of the upper and lower gate threshold voltage adjustment circuits.

9. The circuit of claim 7, wherein the diode emulation mode circuit comprises:

a phase node signal comparator having an output logically combined with the output of the lower gate turn-on timing adjustment circuit; and a blanking circuit, the blanking circuit operable to provide an output at a logic low level representative of the phase node voltage to turn on the lower power switch at the beginning of a lower gate turn-on interval.

10. The circuit of claim 9, wherein the diode emulation mode circuit is further operable to:

compare the phase node voltage to the first threshold voltage reference to detect body diode conduction of a lower body diode; and compare the phase node voltage to the second threshold voltage reference to detect body diode conduction of an upper body diode.

11. The circuit of claim 7, wherein the lower gate turn-on timing adjustment circuit comprises:

a lower gate threshold voltage adjustment circuit; and a lower gate comparator coupled to an output of the lower gate threshold voltage adjustment circuit, the lower gate comparator having a first input coupled to receive a signal representative of a gate voltage at the lower gate of the lower power switch, a second input coupled to receive the first threshold voltage reference from the lower gate threshold voltage adjustment circuit, and an output coupled to the upper power switch.

12. The circuit of claim 11, wherein the lower gate turn-on timing adjustment circuit is operable to:

compare the gate voltage of the upper gate to the first threshold voltage reference to ensure the upper power switch is off before the lower power switch is allowed to be turned on; and if a lower body diode of the lower power switch does not conduct, reduce the first threshold voltage reference using the lower gate threshold voltage adjustment circuit to increase a dead time interval until the lower body diode conducts.

13. The circuit of claim 7, wherein the upper gate turn-on timing adjustment circuit comprises:

an upper gate threshold voltage adjustment circuit; and an upper gate comparator coupled to an output of the upper gate threshold voltage adjustment circuit, the upper gate comparator having a first input coupled to receive a signal representative of a gate voltage at the upper gate of the upper power switch, a second input coupled to receive the second threshold voltage reference from an upper gate threshold voltage adjustment circuit, and an output coupled to the lower power switch.

14. The circuit of claim 13, wherein the upper gate turn-on timing adjustment circuit is operable to:

compare the gate voltage at the lower gate to the second threshold voltage reference to ensure the lower power switch is off before the upper power switch is allowed to be turned on; and when the phase node voltage is higher than the second threshold voltage reference, increase the gate voltage at the lower gate using the upper gate threshold voltage adjustment circuit to substantially reduce a dead time interval.

15. The circuit of claim 7, wherein each of the lower gate and the upper gate threshold voltage adjustment circuits comprise:

a counter operable to store and adjust control data from a controller communicatively coupled to the driver control circuit; and a digital to analog converter operable to convert the control data to an analog representation of each of the first and second threshold voltage references.

16. A voltage regulation system, comprising:

a voltage output circuit having upper and lower power switches, the voltage output circuit operable to provide a voltage output at a phase node coupled between the upper and lower power switches;

a driver control circuit coupled to the voltage output circuit, the driver control circuit including:

at least one body diode conduction detection circuit operable for detecting body diode conduction of body diodes associated with at least one of the upper and the lower power switches of the voltage output circuit, a lower gate threshold voltage adjustment circuit for an upper gate of the upper power switch in operative communication with the at least one body diode conduction detection circuit, and an upper gate threshold voltage adjustment circuit for a lower gate of the lower power switch in operative communication with the at least one body diode conduction detection circuit; and a controller operable to provide a control input to the driver control circuit based at least in part on a feedback signal from the voltage output circuit;

wherein the driver control circuit provides bi-directional voltage threshold calibration based on body diode conduction detected by the at least one body diode conduction detection circuit by selectively adjusting upper and lower gate threshold voltage levels using the upper and lower gate threshold voltage adjustment circuits to reduce a body diode conduction time for at least one of the upper and lower power switches.

17. The system of claim 16, wherein the driver control circuit adjusts the upper and lower gate threshold voltage levels using the upper and lower gate threshold voltage adjustment circuits in response to external operating conditions monitored by the controller.

18. The system of claim 16 and further comprising a diode emulation mode circuit in operative communication with the at least one body diode conduction detection circuit, the diode emulation mode circuit operable to:
    compare the phase node voltage to a first threshold voltage level representative of a gate voltage for the upper gate of the upper power switch to detect body diode conduction of an upper body diode of the upper power switch; and
    compare the phase node voltage to a second threshold voltage level representative of a gate voltage for the lower gate of the lower power switch to detect body diode conduction of a lower body diode of the lower power switch.

19. The system of claim 18, wherein the diode emulation mode circuit detects a zero inductor current crossing based on the monitored body diode conduction level and in response to the threshold voltage levels for the lower and upper power switches.

20. The system of claim 16, wherein the lower gate threshold voltage adjustment circuit provides a first adjustable threshold voltage reference to a lower gate signal comparator as a signal representative of the gate voltage at the lower gate wherein the first adjustable threshold voltage reference increases with body diode conduction and decreases in the near absence of the body diode conduction.

21. The circuit of claim 20, wherein the lower gate signal comparator is operable to:
    compare the gate voltage of the upper gate to the first threshold voltage reference to ensure the upper power switch is off before the lower power switch is allowed to be turned on, and
    wherein, if a lower body diode of the lower power switch does not conduct, the driver control circuit reduces the first threshold voltage reference using the lower gate threshold voltage adjustment circuit to increase a dead time interval until the lower body diode conducts.

22. An electronic device, comprising:
    a switching regulator including upper and lower power switches, the switching regulator operable to provide a voltage output at a phase node coupled between the upper and lower power switches;
    a driver control circuit coupled to the switching regulator, the driver control circuit having at least one body diode conduction detection circuit operable for detecting body diode conduction of body diodes associated with at least one of the upper and the lower power switches of the switching regulator; and
    a load element coupled to a voltage output node of the switching regulator;
    wherein the driver control circuit provides bi-directional voltage threshold calibration for the switching regulator based on the detected body diode conduction by adjusting upper and lower gate threshold voltage levels of the upper and lower power switches to reduce a body diode conduction time for at least one of the upper and lower power switches in the switching regulator.

23. The device of claim 22 and further comprising:
    a filter element coupled to the phase node of the switching regulator, the filter element configured as a low pass filter; and
    a controller operable to provide a control input to the driver control circuit, the controller coupled to receive a feedback voltage from the filter element.

24. The device of claim 22, wherein the driver control circuit further comprises:
    a lower gate threshold voltage adjustment circuit for the upper power switch in operative communication with the at least one body diode conduction detection circuit, the lower gate threshold voltage adjustment circuit operable to adjust the upper gate threshold voltage level; and
    an upper gate threshold voltage adjustment circuit for the lower power switch in operative communication with the at least one body diode conduction detection circuit, the upper gate threshold voltage adjustment circuit operable to adjust the lower gate threshold voltage level.

25. The device of claim 22, wherein the load element is one of a microprocessor, a microcontroller, a field-programmable gate array, a field-programmable object array, a programmable logic device, or an application-specific integrated circuit.

* * * * *

UNITED STATES PATENT AND TRADEMARK OFFICE
CERTIFICATE OF CORRECTION

| | | |
|---|---|---|
| PATENT NO. | : 7,906,948 B2 | Page 1 of 1 |
| APPLICATION NO. | : 12/116092 | |
| DATED | : March 15, 2011 | |
| INVENTOR(S) | : Qiu et al. | |

It is certified that error appears in the above-identified patent and that said Letters Patent is hereby corrected as shown below:

On the Front Page, Section 60, Related U.S. Application Data, please add --Provisional Application No. 60/951,259, filed on Jul. 23, 2001, and Provisional Application No. 60/951,261, filed on Jul. 23, 2007.--

Signed and Sealed this
Twenty-eighth Day of August, 2012

David J. Kappos
*Director of the United States Patent and Trademark Office*